United States Patent [19]

Kley

[11] 4,435,616
[45] Mar. 6, 1984

[54] GRAPHICAL DATA ENTRY APPARATUS

[76] Inventor: Victor B. Kley, 1119 Park Hills Rd., Berkeley, Calif. 94708

[21] Appl. No.: 296,238

[22] Filed: Aug. 25, 1981

[51] Int. Cl.³ .............................................. G08C 21/00
[52] U.S. Cl. ...................................................... 178/18
[58] Field of Search .............................. 178/18, 19, 20; 340/146.3 SY, 365 S, 365 C, 365 A, 710, 709; 33/1 M; 324/61 P; 250/359, 368, 491.1, 385; 378/206

[56] References Cited

U.S. PATENT DOCUMENTS

| 2,975,235 | 3/1961 | Leitner et al. | 178/18 |
| 3,522,664 | 8/1970 | Lambright et al. | 33/8 |
| 3,798,370 | 3/1974 | Hurst | 178/18 |
| 3,959,585 | 5/1976 | Mattes et al. | 178/18 |
| 4,079,194 | 3/1978 | Kley | 178/18 |
| 4,178,481 | 12/1979 | Kley | 178/18 |
| 4,184,044 | 1/1980 | Zwerenz | 178/18 |
| 4,214,122 | 7/1980 | Kley | 178/18 |

Primary Examiner—Stafford D. Schreyer
Attorney, Agent, or Firm—Bernard, Rothwell & Brown

[57] ABSTRACT

Improvements in graphic tablets employing resistance planes are disclosed including one or more of the following: a tablet usable both by depression and by capacitive probe, reference connections to side midpoints, automatic gain control for capacitive readings, selective high voltage tablet energization for increased resolution reading of a detected region, forming high resistance edges by bending flaps so that resistance flux deposition is oblique to the flaps, separate overlying substrates with edge connecting resistances, and cursor light and/or infrared positioning beam generators.

13 Claims, 23 Drawing Figures

GRAPHICAL DATA ENTRY APPARATUS

TECHNICAL FIELD

The present invention relates to apparatus including a graphic or tablet device for generating data or control signals to be used or stored in computer or data processing apparatus, and particularly to such apparatus wherein the graphic device includes a planar resistive member for producing a voltage gradient throughout one or more dimensions thereof and the data or control signal generated corresponds to a point or points on the resistance selected by a probe or by engagement of a conductor.

DESCRIPTION OF THE PRIOR ART

The prior art, as exemplified in U.S. Pat. No. 2,975,235, No. 3,522,644, No. 3,798,370, No. 3,959,585, No. 4,079,194 and No. 4,178,481, includes a number of apparatus with graphical entry devices. Generally the prior art graphical entry devices employing planar resistance members utilize either a contact probe or a capacitive probe or utilize overlying or underlying conductive members wherein the conductive member or resistance member can be depressed at a point to connect the conductor to the resistance; such prior art devices are unsuitable for use with both capacitive probes and depression contact procedures since depression of an overlying resistance layer causes deformations rendering the device unsuitable for accurate readings from a capacitive probe. The capacitance probes in the prior art generally have one or more deficiencies, such as producing varying pickup due to changes in proximity, humidity, clothing, component variation, etc., requiring separate push button entry devices to enter symbols; not being able to be easily and precisely positioned; etc. Prior art techniques of manufacturing resistance pads with higher resistance edge strips for connecting the resistance pads to live circuitry requires several manufacturing steps and procedures. Additionally, prior art resistance pads often require considerable space for making edge connections to the active resistance area, or produce inaccuracies in reference voltages to analog-to-digital converters. Resolution of a selected point within resistance areas of prior art devices is limited to the range and output of the analog-to-digital converter sensing the detected voltage from the resistance area. Prior art capacitance probes are difficult to accurately position due to parallax, size of positioning indicators, etc.

SUMMARY OF THE INVENTION

In a first aspect of the invention, a graphical entry device includes a rigid base member having a flat conductive upper surface, a thin non-conductive plate formed of a material selected from glass or rigid plastic disposed over the base member in close proximity thereto, a layer including resistive material on the underside of the thin plate and extending parallel the conductive upper surface of the base member in spaced relationship therewith, the plate being elastically deformable to engage a point of the resistive material with the conductive surface where depressed, and the plate being sufficiently thin to permit substantial capacitive coupling therethrough between a capacitance probe and the resistive layer.

In a second aspect of the invention, a graphical entry device includes an electrically insulated substrate; and a patterned layer on the substrate wherein the patterned layer has a generally rectangular resistive graphic area with four edges and four corners, each of the four edges defining a midportion separating a pair of spaced joining portions extending from the midportions to the respective corners, four pairs of conductor strips spaced from and extending along the respective pairs of joining portions, four pairs of resistive edge connecting means joining the respective pairs of conductor strips to the respective pairs of joining portions, the resistive edge connecting means each having an effective resistance parallel to the respective joining portions substantially greater than that of the graphic area and the respective conductor strips, and four conductors connected to the respective midportions for providing analog-to-digital converter reference voltages.

In a third aspect, a graphic entry apparatus includes a member having a planar resistance thereon; a capacitance probe for being moved over the planar resistance and capacitively coupling to selected points thereof; means for sequentially energizing the planar resistance with at least first, second and third voltage conditions wherein the first voltage condition produces a voltage gradient across the planar resistance in a first direction, the second voltage condition produces a voltage gradient across the planar resistance in a second direction which is orthogonal to the first direction, and the third voltage condition produces a uniform voltage throughout the planar resistance; means connected to the probe and including amplifier means operated during the first and second voltage conditions for generating signals indicative of the position of the probe; and gain control means connected to the probe and operated during the third condition for controlling the gain of the amplifier means to prevent variations in capacitive coupling between the probe and the resistance from changing the value of the position signals.

In a fourth aspect, an analog data tablet apparatus with enhanced resolution includes a resistance having at least one elongated dimension, probe means for being selectively coupled with a selected point on the resistance, analog-to-digital converter means connected to the sensing means for producing the digital output corresponding to a voltage on the probe means within an analog operating range of voltages, first means for applying a voltage equal to the analog operating range of voltages across the resistance during a first portion of a reading cycle, means responsive to the output on the analog-to-digital converter means for determining a region of the resistance within which the selected point is positioned, and means controlled by the region determining means for applying across the resistance a corresponding one of a plurality of voltages substantially greater than the analog operating range of voltages during a second portion of the reading cycle such that the analog operating range of voltage is produced across the determined region of the resistance whereby the analog-to-digital converter means during the first and second portions of the reading cycle produces respective outputs indicating the position of the selected point with enhanced resolution.

In fifth aspect, a method of making a rectangular resistance pad with high resistance flaps includes the steps of forming a flexible insulated substrate with a rectangular area bounded by flaps on the edges of the rectangular area, wherein the flaps are bent at a selected angle relative to the plane of the rectangular area, and depositing resistance material into the rectangular area and flaps by means of a uniform flux of the resistance material perpendicular to the rectangular area whereby the flaps have substantially increased resistivity relative to the rectangular area.

In a sixth aspect, a resistance graphic tablet includes first, second and third rectangular substrates positioned on top of each other, a uniform resistance layer covering one side of the first substrate, first and second isolating resistance areas extending on opposite edges of the second substrate, first and second pluralities of connecting means connecting the first and second isolating resistance areas to respective first opposite edges of the uniform resistance layer, third and fourth isolating resistance areas extending on opposite edges of the third substrate, and third and fourth pluralities of connecting means connecting the respective third and fourth isolating resistance areas to respective second opposite edges of the uniform resistance layer.

In a seventh aspect of the invention, a cursor device for capacitively coupling to a graphics tablet includes a body having a bottom surface adapted for sliding on the graphics tablet and including a vertical opening therethrough for viewing an area of the tablet, a transparent bottom member extending over the opening on the bottom of the opening, a transparent electrode mounted on the bottom member centrally relative with the opening, and light beam generating means on the body for generating a vertical beam of light concentric with the electrode to enable accurate positioning of the cursor device.

An object of the invention is to provide substantially improved graphical entry devices and apparatus as well as to provide less costly techniques of manufacture and assembly.

This as well as other objects and advantages of the invention will be apparent from the following description of the preferred embodiment taken in conjunction with the accompanying drawings.

DESCRIPTION OF THE PREFERRED EMBODIMENT

Figure 1:
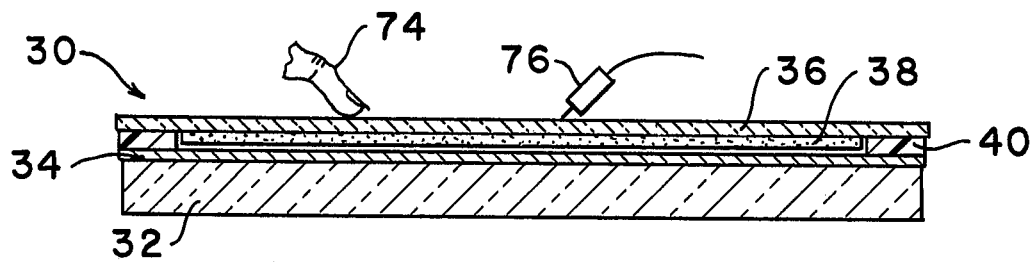
FIG. 1 is a cross section view of a graphical data entry tablet or device in accordance with the invention.
Figure 2:
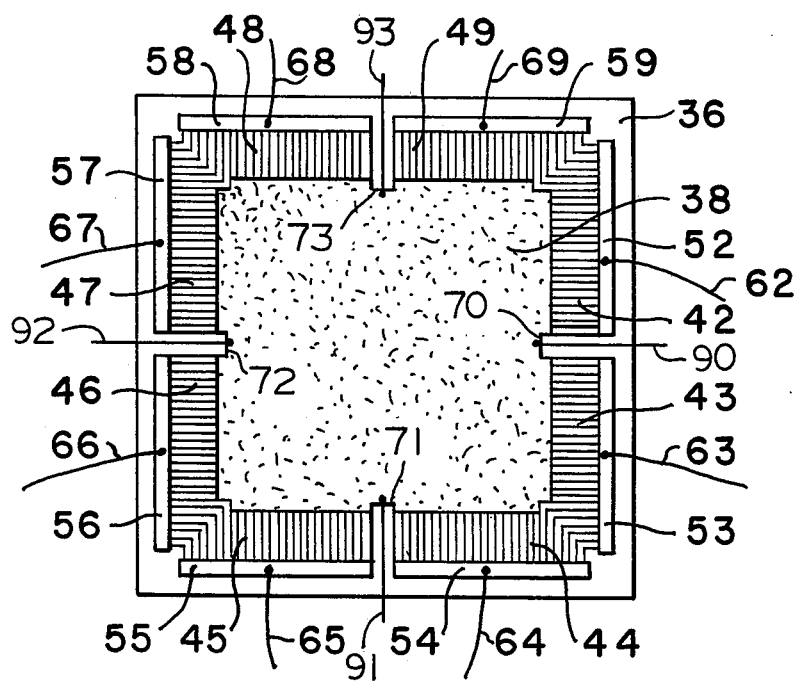
FIG. 2 is a bottom view of a top member of the device of FIG. 1.
Figure 3:
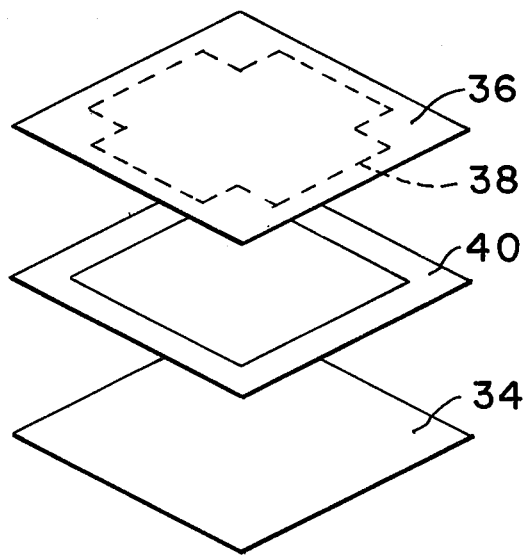
FIG. 3 is an exploded perspective view showing the arrangement and assembly of parts of the tablet of FIG. 1.

In accordance with the invention as illustrated in FIGS. 1, 2 and 3, a graphical entry device indicated generally at 30 includes a base 32 having an upper conductive surface or layer 34, and an upper plate member 36 having a resistive member 38 thereon mounted by an edge spacer 40 on the base 32. The base 32 is generally formed from a rigid material and as illustrated may be formed from glass with a conductive layer 34 deposited thereon. Alternatively, the member 32 may be a metal conductor thus not requiring the separate layer 34. The upper member 36 is formed from a rigid non-conductive material, such as tempered glass, polycarbonate plastic, or other rigid durable material. The layer 38 is formed from indium-tin oxide, gold, or other durable resistive and conductive material. The spacer 40 is insulative and has a thickness selected to support the member 36 with its resistance member 38 in close proximity but spaced from the conductive surface 34. A preferred spacing is in the range from 0.025 to 0.25 millimeters (0.001 to 0.01 inches). If desired, the base 32, conductive surface 34, plate 36 and resistance layer 38 may all be transparent. Also, the base 32 may be the face plate of a CRT or other display device.

The rigid plate 36 has a thinness selected in conjunction with the thickness of the spacer 40 so that pressure of a finger 74 or other probe on a selected point on the surface of the plate 36 elastically deforms the plate 36 to bring about contact of the resistance 38 with the conductive layer 34 at the selected point. Additionally, the plate 36 has a thinness suitable for use with a capacitance probe 76 which can couple through the layer 36 to the resistance layer 38 at a selected point. Thus, the present device illustrated in FIGS. 1, 2 and 3 is suitable for use either as a depression-actuated graphic pad or as a capacitance-probe actuated graphic pad. Prior art graphic pads were limited to only one method of actuation such as by depression or capacitance probe. The employment of the rigid durable material, e.g. tempered glass, polycarbonate or the like, in the plate 36 makes possible the present device since this rigid durable material retains its strength, durability and thickness even when depressed.

The resistance member 38, as shown in FIG. 2, has a generally rectangular central area defining four corners and four edges which have half edge joining portions connected by respective high resistance areas 42, 43, 44, 45, 46, 47, 48 and 49 to respective conductive strips 52, 53, 54, 55, 56, 57, 58 and 59, spaced from and extending along the respective edge joining portions. Tablet drive leads 62, 63, 64, 65, 66, 67, 68 and 69 are connected to the respective conductor strips 52, 53, 54, 55, 56, 57, 58 and 59. The high resistance areas 42–49 have an effective resistance, parallel to the respective edges to which they are connected, which is substantially greater than the resistance of the rectangular central area 38 so that shunting of the edges by the conductor strips 52–59 is substantially reduced. The construction and manufacture of similar resistance members is described in U.S. Pat. No. 4,079,114, No. 4,178,481 and No. 4,214,122 which are incorporated by reference herein.

The resistance member 38 differs from the prior resistance members by including notches 70, 71, 72 and 73 defining midportions of the respective edges of the central rectangular resistive area. The midportions 70–73 separate and space apart the respective pairs of half edge portions of the resistance area 38 connected to the high resistance areas 42–49. Additionally, the pairs of resistance areas 42–49 and conductive strips 52–59 on the respective edges of the graphic area 38 are spaced apart by a distance equal to the width of the notches 70–73. Conductors 90, 91, 92 and 93 are connected to the respective midportions 70, 71, 72 and 73 at the bottom of the notches.

In use of the graphics tablet with the member 38, the conductors 90–93 are sequentially connected to reference voltage inputs of analog-to-digital converter means used to measure voltages from the reference edges to a selected point of depression or capacitance probe. Previous tablets used the edge connectors for such reference inputs resulting in less resolution due to the voltage drop across the edge connection means. The provision of the midportions 70–73 at the bottoms of the notches with conductors 90–93 eliminates this voltage drop and results in a more accurate reference voltage for the analog-to-digital converter. The half-edge portions of the graphics area 30 joined to resistance areas 42–49 extend outward by the depth of the notches 70–73 producing greater linearity within the central portion of the graphics area.

Figure 4:
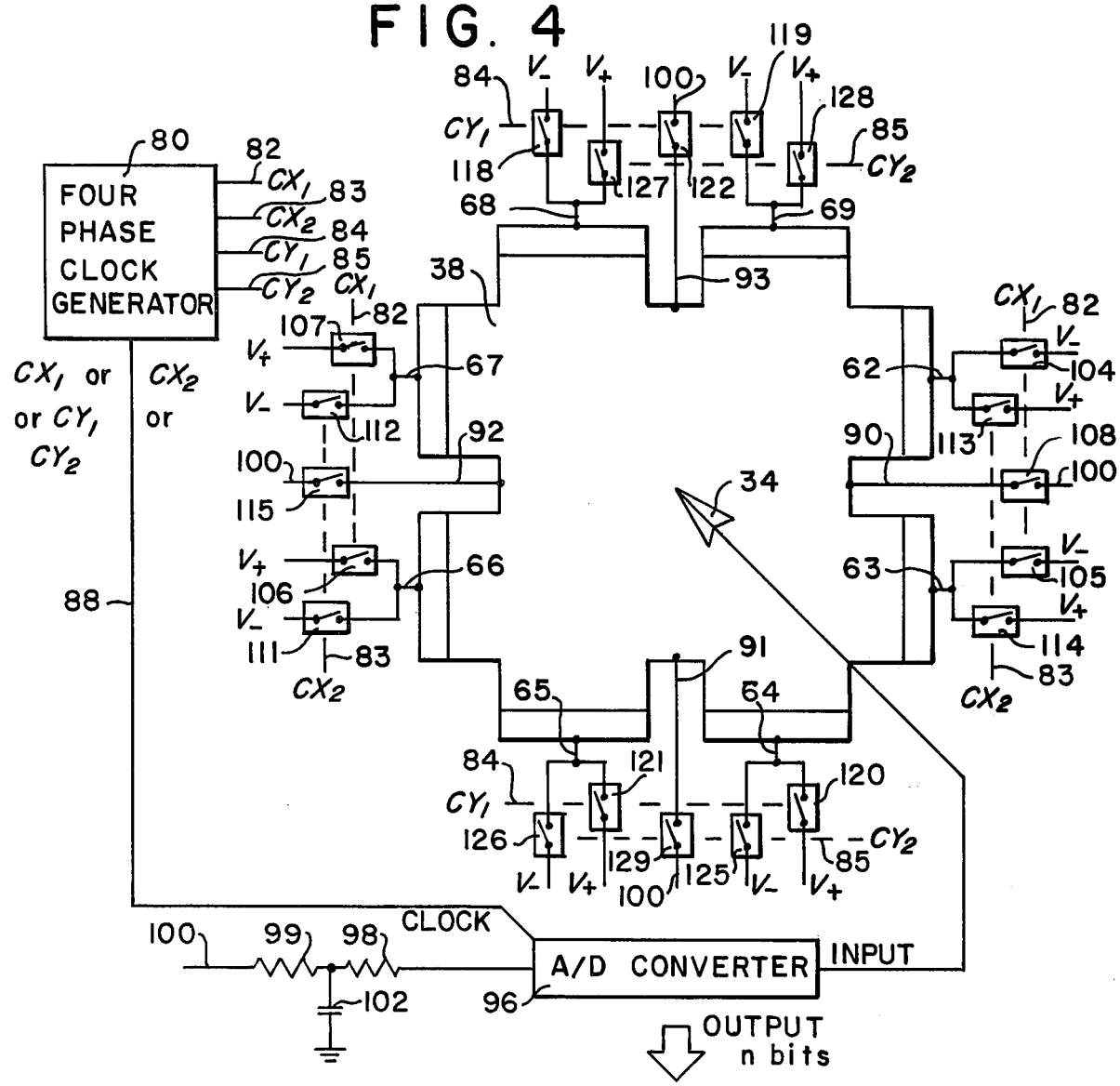
FIG. 4 is a diagram illustrating circuitry for generating binary position output signals when a resistance tablet is used in the contact mode.

In a circuit, FIG. 4, or portion of a circuit for driving the graphite tablets 38 utilizing the conductive surface 34, illustrated as a conductive probe, a four-phase clock generator circuit 80 has output lines 82, 83, 84 and 85 on which are cyclically generated respective sequential control pulses. The generator 80 also has an output line 88 which generates a clock pulse or strobe pulse during each of the sequential pulses generated on lines 82, 83, 84 and 85. The conductive surface 34 is connected to one input of an analog-to-digital converter 96 which has its clock input connected to the strobe line 88 from the generator 80 and has its reference input connected by means of a pair of serial resistances 98 and 99 to a common reference line 100; the junction between the resistances 98 and 99 being connected to one side of a filtering capacitance 102 which has its opposite side connected to ground. The output 82 of the generator 80 is connected to control inputs of normally open analog electronic switches 104 and 105 which are connected between a negative voltage supply line V− and the respective tablet drive lines 62 and 63; is connected to control inputs of normally open analog electronic switches 106 and 107 connected between a positive voltage source V+ and the tablet drive lines 66 and 67; and is connected to a control input of a normally open analog electronic switch 108 connected between the tablet edge reference line 90 and the common reference line 100. The output line 83 is connected to control inputs of normally open analog electronic switches 111 and 112 connected between the negative voltage supply V− and the respective input drive lines 66 and 67; is connected to control inputs of normally open analog electronic switches 113 and 114 connected between the positive voltage supply line V+ and the respective tablet drive lines 62 and 63; and is connected to an operating input of a normally open analog electronic switch 115 connected between the tablet edge reference line 92 and the common reference line 100. The output line 84 is connected to control inputs of normally open analog electronic switches 118 and 119 which are connected between the negative voltage source line V− and the respective tablet drive lines 68 and 69; is connected to control inputs of normally open analog electronic switches 120 and 121 which are connected between the positive voltage supply line V+ and the respective tablet drive lines 64 and 65; and is connected to an operating input of a normally open analog electronic switch 122 which is connected between the edge voltage reference line 93 and the common reference 100. The output 85 of the clock generator 80 is connected to control inputs of normally open analog electronic switches 125 and 126 which are connected between the negative voltage supply line V− and respective tablet drive lines 64 and 65; is connected to operating inputs of normally open analog electronic switches 127 and 128 which are connected between the positive voltage supply line V+ and the respective tablet drive lines 68 and 69; and is connected to an operating input of a normally open analog electronic switch 129 which is connected between the edge reference line 91 and the common reference line 100.

In operation of the circuitry of FIG. 2, the four-phase clock generator 80 sequentially produces pulses on the respective lines 82, 83, 84 and 85 during each cycle of operation thereof. During the pulse on the line 82, lines 66 and 67 are positive while lines 62 and 63 are negative to produce a voltage gradient across the resistance square 38 from left to right, and during the pulse on line 83, the polarity on the lines 62, 63, 66 and 67 are reversed. During the pulse on the line 82, the analog-to-digital converter is clocked by the signal on line 88 to produce a digital output corresponding to the voltage between the point of contact to conductor 34 and the reference line 90, and during the pulse on line 83 the clock pulse on line 88 causes the analog-to-digital converter 96 to read the voltage between the reference line 92 and the point of contact of the conductor 34. The pulses on lines 84 and 85 subsequently produce sequential readings of voltage values between the conductor 34 and the upper and lower reference lines 93 and 91.

The output of the analog-to-digital converter 96 producing N binary bits is applied to a computer or processor which, from the four sequential readings, computes the position of the point of contact. The most precise way to actuate and use the graphics tablet is to alternately measure the X (or Y) distance (voltage) from one edge and then from the opposite edge. In the computer, the sum of the readings is utilized to determine the contact area of uncertainty, i.e. whether the probe or conductor contact with the resistance layer is sufficient to produce a suitable reading. The difference between the readings is either added to or subtracted from one-half of the voltage range of the analog-to-digital converter to produce the position from one edge. The following formula are typical formula used in computer algorithms:

| | | |
|---|---|---|
| | $X_1$ = Voltage from edge 1 | |
| | $X_2$ = Voltage from edge 2 | |
| | d = Contact area of uncertainty | |
| 1: | $d = 1 - \dfrac{(X_1 + X_2)}{(A/D \text{ accuracy})}$ | A/D accuracy = $A_D$ for 12 bits, $A_D$ = 4096 |
| | the measure from edge 1 = $D_1$ | |
| 2: | $D_1 = \tfrac{1}{2} + \dfrac{X_1 - X_2}{A_D}$ | |
| 3: | $D_1 (2A_D) = A_D + X_1 - X_2$ | $D_1$ range 0 < = 1 |
| 4: | $d = A_D - (X_1 + X_2)$ | d range 0 < = 1 |

Equations 3 and 4 above represent the most suitable form for computer algorithms, $D_1$ being X (or Y) position and d being related to actuation pressure in direct wipe and distance above the surface in capacitive wipe or pickup.

Figure 7:
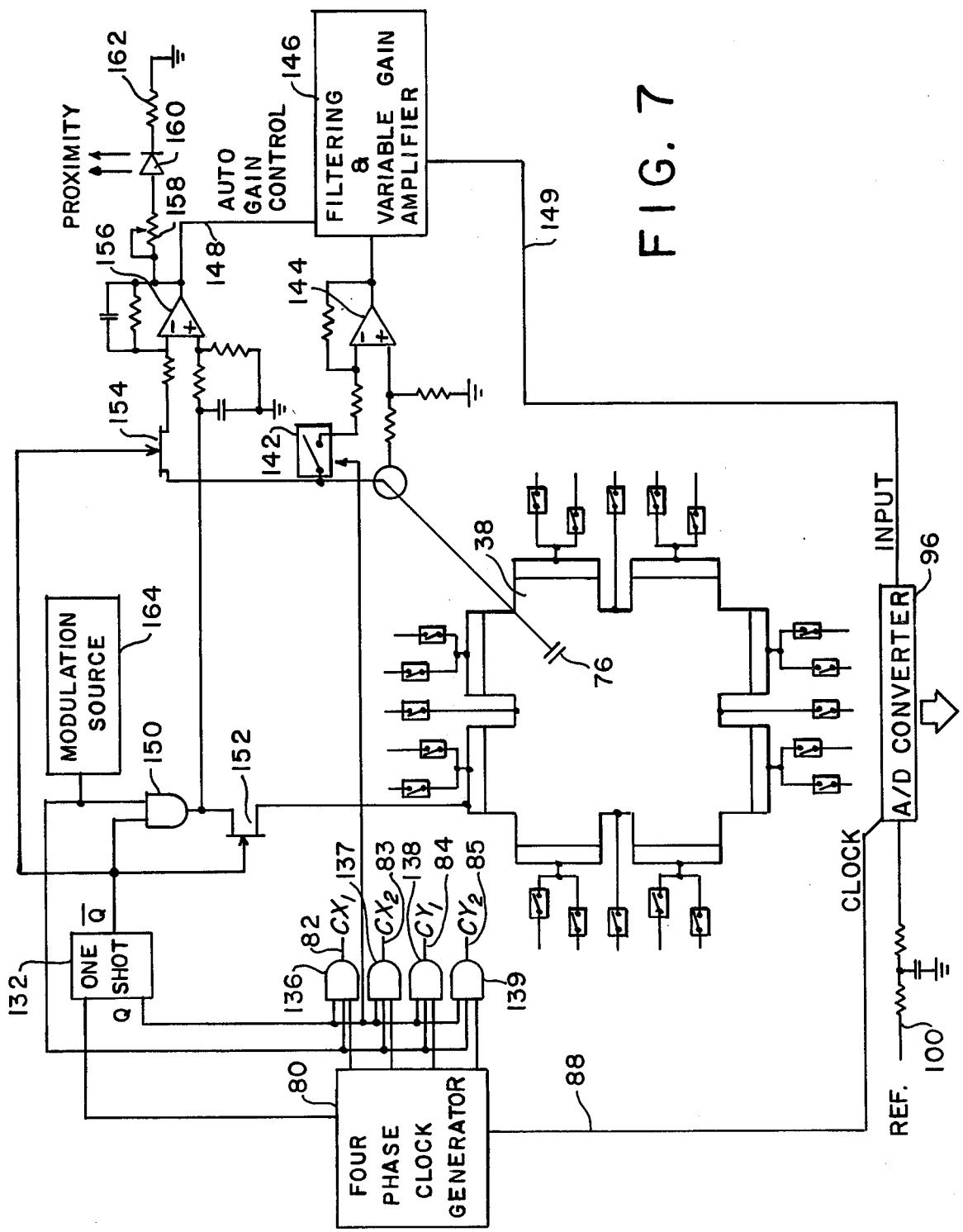
FIG. 7 is a diagram of circuitry for generating binary position output signals when a capacitive probe is utilized for generating graphical data.

A circuit utilizing the capacitive probe 76 is illustrated in FIG. 7 and includes a one shot 132 having its triggering input connected to an output of the four-phase clock generator 80, which output produces a pulse during each of the sequential phase outputs in a manner similar to the line 88 except with a different phase; for example, the output to one-shot 132 can be at the beginning of each of the sequential phase outputs, and the clock of the line 88 is pulsed during the last half of each of the sequential phase outputs. The one shot 132 is selected to have a time duration equal to only a portion of the time duration of each of the sequential phase outputs, for example, the output of the one shot 132 is selected to have a duration equal to one half of the pulse durations on the sequential phase outputs of the generator 80. The non-inverted output of the one shot 132 is connected to first inputs of NAND gates 136, 137, 138 and 139 which have second inputs connected to the respective phase outputs of the generator 80 for generating shortened reading periods on the tablet drive lines 82, 83, 84 and 85. The non-inverted output of the one shot 132 is also connected to a control input of a normally open electronic analog switch 142 which connects the probe 76 to a buffer amplifier circuit 144 which has its output connected to an input of a filtering and variable gain amplifier circuit 146. The circuit 146 includes a variable gain amplifier which has its amplification controlled by a line 148 to produce an output which is applied to the input of the analog-to-digital converter 96. The inverted output of the one shot 132 is connected to one input of an AND gate 150 and also to the control electrode of a switching transistor 152 which is coupled between the output of the AND gate 150 and one edge of the resistance layer 38 for energizing the resistance layer 38 with a voltage signal during the periods between tablet drive signals on lines 82, 83, 84 and 85. The inverted output of the one shot 132 is also connected to the control electrode of a switching transistor 154 which is connected between the capacitance probe 76 and an input of an operational amplifier integrating circuit 156 which has its output connected to the automatic gain control line 148. The output of the amplifier 156 is also connected across a series circuit including a variable resistance 158, a light emitting diode 160 and a resistance 162 for producing an indication from the light emitting diode 160 when the probe 76 is not within close proximity to the resistance plane 38. Optionally, the circuit includes a modulation source 164 which is connected to third inputs of the AND gates 136, 137, 138 and 139 as well as to a second input of the AND gate 150 for producing a modulation frequency to provide better pickup by the capacitance probe 76. Conventional filter circuits within the circuit 146 are designed to pass only the modulation frequency to provide for better noise immunity.

In operation of the tablet 38 in the capacitive wipe mode by the circuit of FIG. 7, the one-shot 132 permits the NAND gates 136–139 to operate only during the second halves of each of the sequential phase outputs of generator 80 to provide tablet drive signals on lines 82, 83, 84 and 85 which operate analog switches connecting the X and Y reading signals to the tablet in the same manner as with the circuit of FIG. 4 except the modulation source 164 supplies the V+ and V− voltage. During the half periods before each of the sequential drive signals on the lines 82, 83, 84 and 85, a signal is applied by the transistor switch 152 to the tablet 138. Since the electronic tablet drive switches are open during these periods, the voltage potential applied through switch 152 will be uniform throughout the entire resistance plane 38; i.e., the resistance plane 38 will radiate a voltage potential like an antenna, without any voltage differential between all points of the plane 38. The signal picked up during the period of operation of the switch 152 is coupled by the switch 154 to the integrator 156 which produces the gain control signal on line 148. This gain control signal will be inversely proportional to the magnitude of the signal picked up by the probe 76 during the first portions of the tablet drive signals from the phase generator 80 to adjust the gain of the amplifier 146 during the second portions of the sequential tablet drive signals when the X and Y reading voltages are applied across the resistance area 38. Thus, variations based upon proximity, humidity, clothing, and component variation which affect the magnitude of voltage coupled capacitively from the tablet plane 38 to the probe 76 are automatically overcome by the variable gain of the amplifier circuit 146 under control of the output of the integrator 156.

Figure 10:
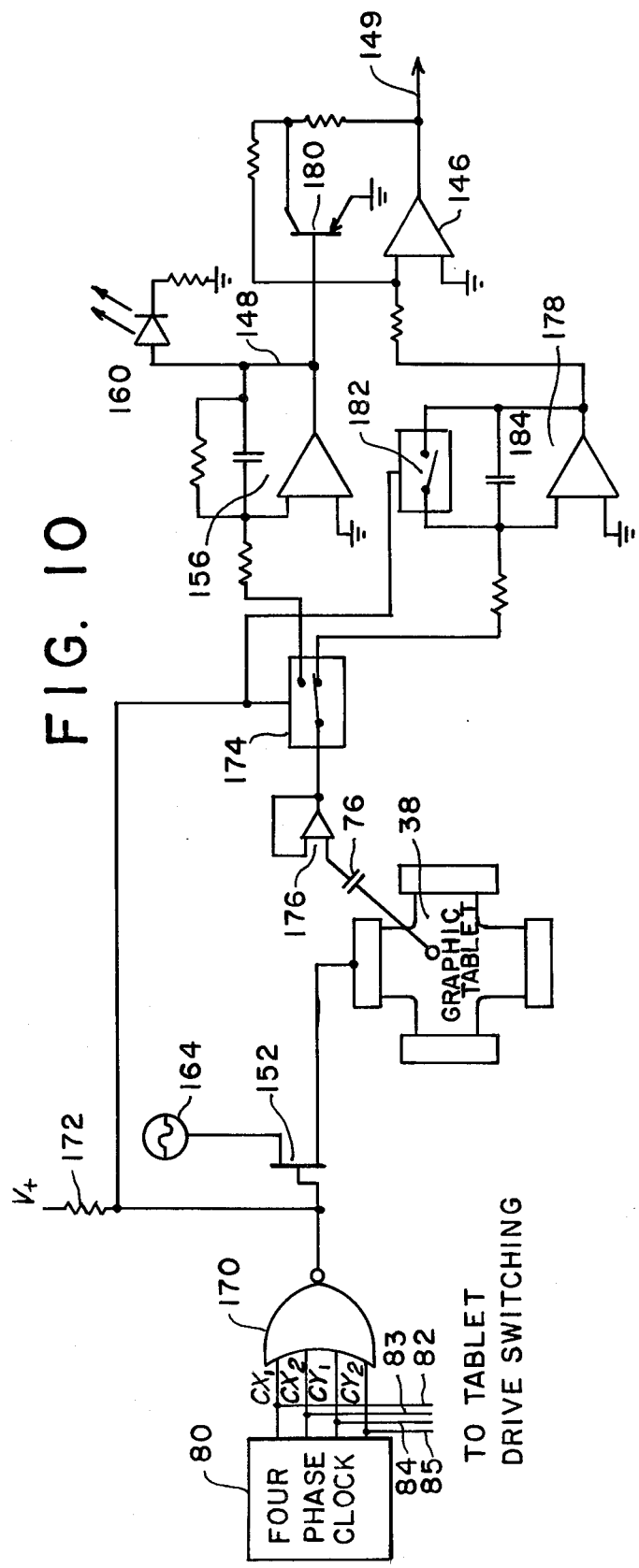
FIG. 10 is a schematic diagram of a variation of the circuit of FIG. 7.
Figure 11:
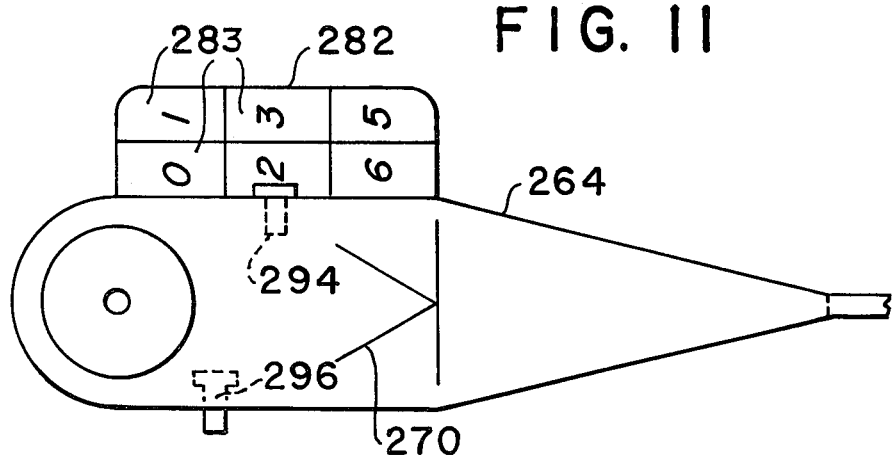
FIG. 11 is a top view of a capacitance probe.
Figure 12:
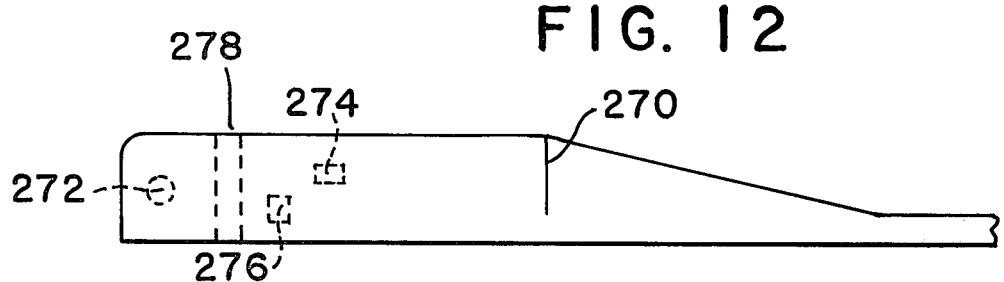
FIG. 12 is a side elevation view of the capacitance probe of FIG. 11.
Figure 13:
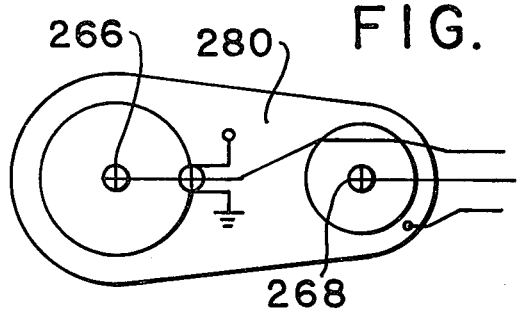
FIG. 13 is a bottom view of the capacitance probe of FIGS. 11 and 12.
Figure 14:
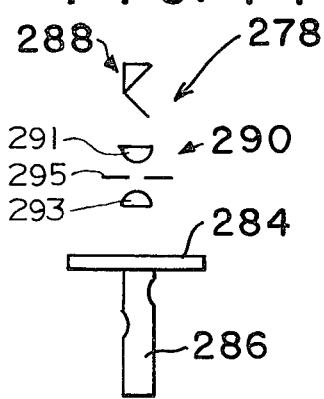
FIG. 14 is an exploded assembly view illustrating a portion of a light and infrared spot producing facility in the strobe of FIGS. 11-13.
Figure 15:
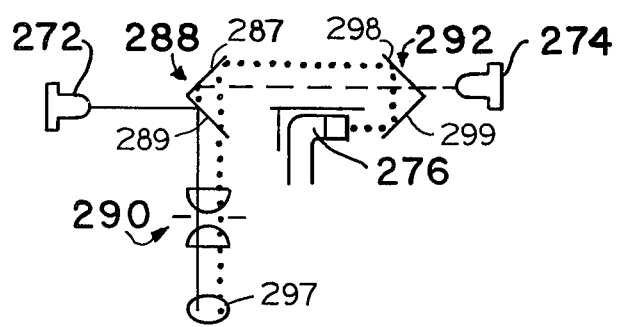
FIG. 15 is a schematic illustration of the light and infrared spot producing arrangement within the strobe of FIGS. 11-13.
Figure 16:
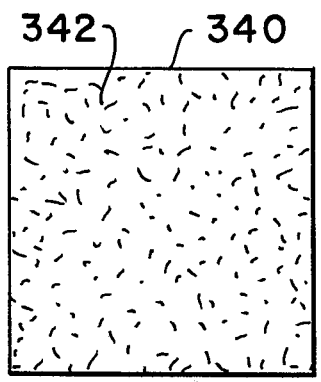
FIG. 16 is a plan view of a first member forming a uniform resistance pad.
Figure 17:
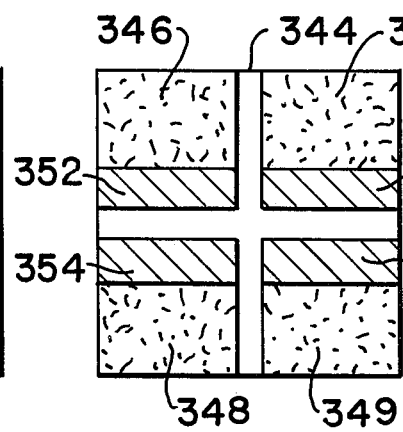
FIG. 17 is a plan view of a second member for connecting to the resistance area of FIG. 16.
Figure 18:
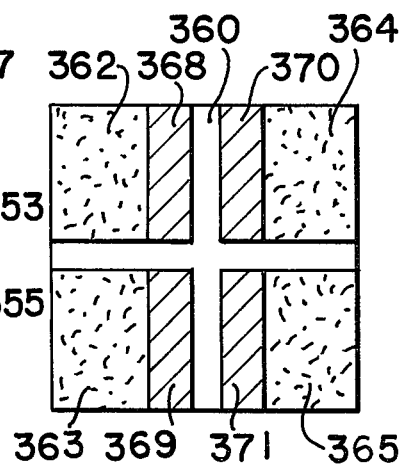
FIG. 18 is a plan view of a third member for connecting to the resistance area of FIG. 16.
Figure 19:
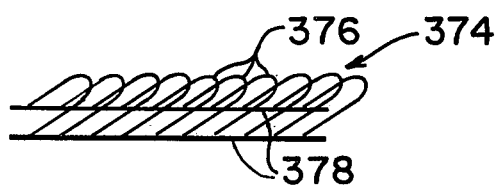
FIG. 19 is a perspective view of a plurality of conductors for connecting an isolating resistance area of the members of FIGS. 17 and 18 to an edge of the uniform resistance member of FIG. 16.
Figure 20:
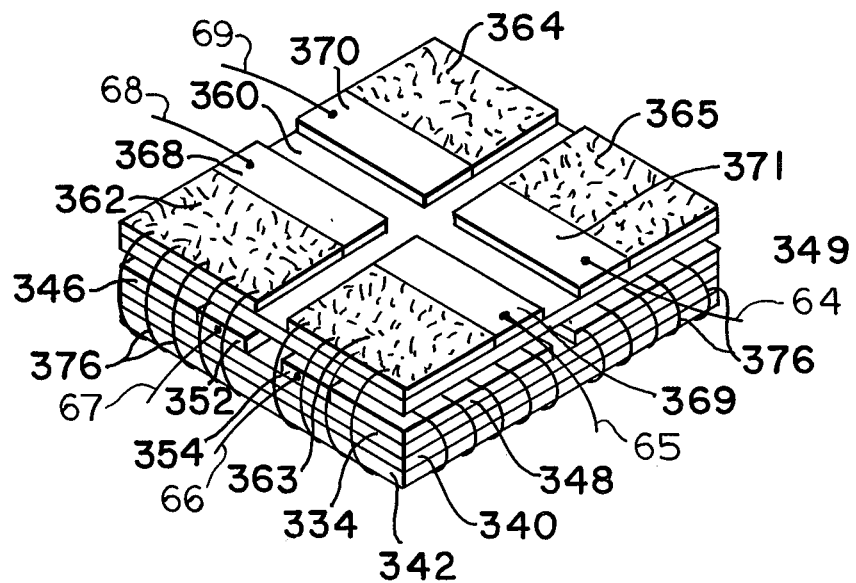
FIG. 20 is a perspective view illustrating the assembled members of FIGS. 16-19.

A variation of the automatic gain circuit coupled graphics data tablet is illustrated in FIG. 10. A four input NOR gate 170 has its inputs connected to the respective tablet drive switching lines 82, 83, 84 and 85 and has its output connected to the control electrode of the transistor switch 152, the output being biased by a resistance 172 connected to a positive voltage source. In this variation the sequential tablet drive signals on the lines 82–85 from the four phase clock 80 have periods between each cycle or each drive signal suitable for reading the probe pickup. The output of the NOR gate 170 is also connected to a double-throw analog switch device 174 which normally connects the output of the probe 76 via a buffer amplifier 176 to the input of the operational amplifier integrator circuit 178, and when operated by the output of the NOR gate 170, connects the probe 76 to the input of the integrator circuit 156 which generates the auto gain control signal on line 148 to control a linear transistor 180 connected in the feedback circuit to control the gain of the amplifier 146 which has its input connected to the output of the integrator 178 and it output connected to the line 149 to the input to the analog-to-digital converter. A normally open electronic analog switch 182 operated by the output of the NOR gate 170 is connected across the integrating capacitance 184 in the integrator 178. The circuit of FIG. 10 is similar to the circuit of FIG. 7 and utilizes the spacing between cycles or each of the tablet drive signals on the lines 82, 83, 84 and 85 to generate an automatic gain control signal in accordance with the proximity, humidity, or other factors affecting the pickup of the capacitive probe 76 from the resistive plane 38.

Additionally, separate automatic gain, conditioning and analog-to-digital conversion may be provided to the X-axis and Y-axis along with dual modulation frequencies for tablet energization and separate reference signals controlled by the respective X-axis and Y-axis pickoff electrodes.

Figure 8:
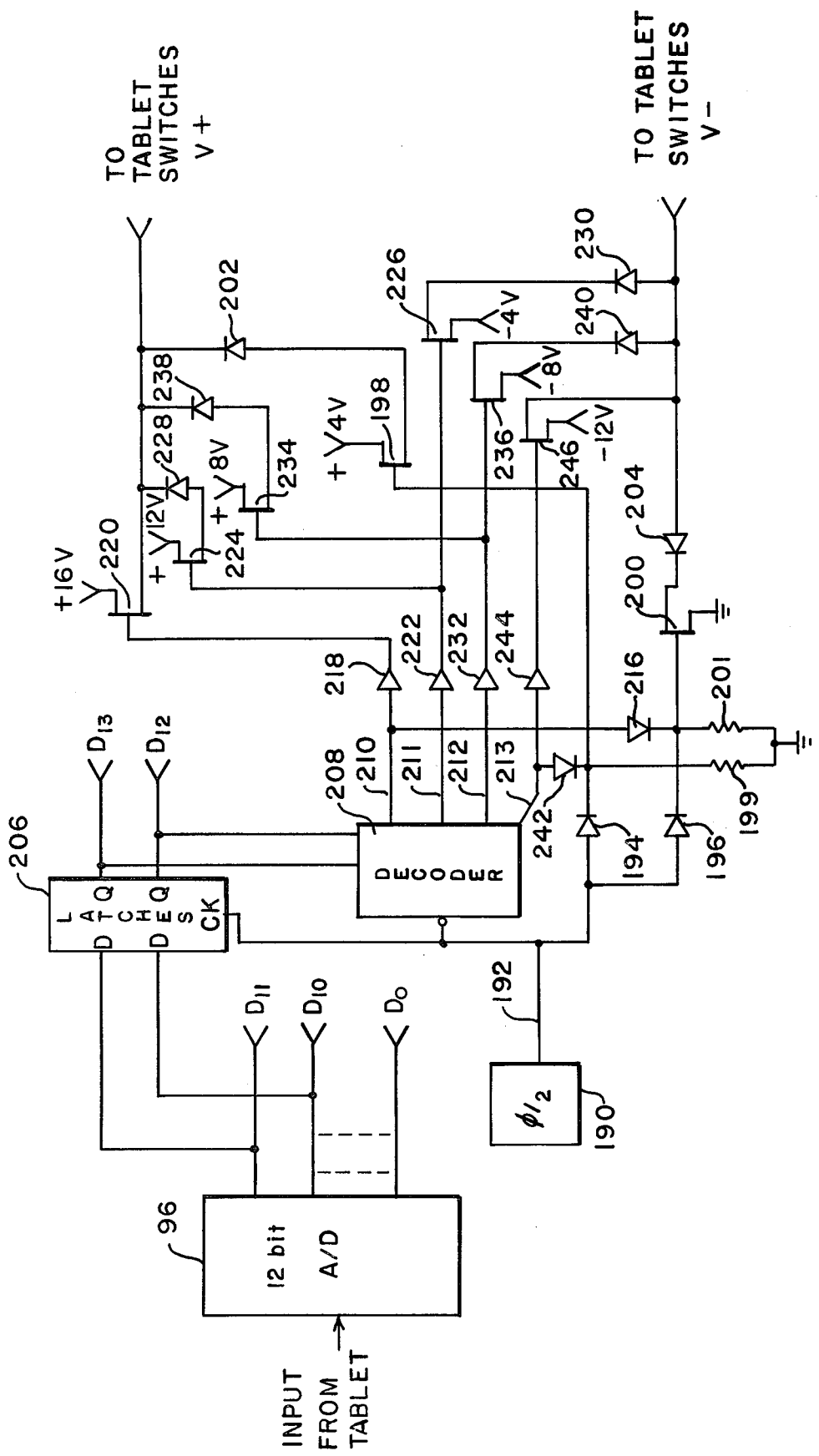
FIG. 8 is a diagram of a circuit for providing increased resolution in reading data from a graphical entry device.

In FIG. 8, there is illustrated a circuit for enhancing the resolution of the reading from the graphics tablet by stop voltage adjustment of the drive voltages V+ and V− connected to the tablet drive switches 104–107, 111–114, 118–121 and 125–128 (FIG. 4). The circuit includes a $\phi/2$ source 190 which is a divider tied to the primary clock of the A/D converter 96 and which is timed to operate in synchronism with the analog-to-digital converter 96 and which produces a positive voltage on output line 192 during a first portion of each tablet voltage read cycle and produces a low output on line 192 during a second portion of each tablet read cycle. The line 192 is connected by isolation diodes 194 and 196 to respective control electrodes of switching transistors 198 and 200, these control electrodes biased at ground potential by resistances 199 and 201. The transistor 198 is connected between a +4 volt supply and the anode of a diode 202 which has its cathode connected to the V+ line. The transistor 200 is connected between ground or 0 voltage source and the cathode of a diode 204 which has its anode connected to the V− line. One or more, for example two, of the most significant outputs of the analog-to-digital converter 96 are connected to data inputs of a multiple latch circuit 206, which has its clock input connected to the line 192 and has its outputs connected to the inputs of a decoder circuit 208 which has its enable input connected to the line 192. The latch circuits 206 and decoder circuit 208 are such that the latches 206 are set during the first portion of the signal on line 192 and the decoder 208 is operated during the second portion of the cycle on line 192. The decoder circuit 208, when enabled, is such that it generates an output on a selected one of the output lines 210, 211, 212 and 213 in accordance with the binary number represented by the outputs of the latch circuits 206. The output 210 is connected by a diode 216 to the control electrode of the transistor 200 and by a suitable voltage translating device 218 to the control electrode of a switching transistor 220 which is connected between a 16 volt supply source and the V+ line to the table drive switches. The output 211 is connected by a suitable voltage translating circuit 222 to control electrodes of switching transistors 224 and 226. The switching transistor 224 is connected between a +12 volt supply source and the V+ voltage drive line with an isolating diode 228 connected between the transistor 224 and the V+ line. The switching transistor 226 is connected between a −4 volt supply source and the V− tablet voltage line with an isolating diode 230 connected between the transistor 226 and the V− line. The output 212 is connected by a voltage translating circuit 232 to control electrodes of switching transistors 234 and 236. The switching transistor 234 is connected between a +8 volt supply and an isolating diode 238 to the positive tablet voltage supply line V+, while the switching transistor 236 is connected between a −8 volt supply source and an isolating diode 240 to the negative tablet supply line V−. The output 213 is connected by an isolation diode 242 to the control electrode of the switching transistor 198 and is connected by a voltage translating circuit 244 to the control electrode of a switching transistor 246 which is connected between a −12 volt supply source and the negative tablet supply voltage line V−.

In operation of the resolution enhancing circuit for reading analog data from the tablet, it is assumed that the analog-to-digital converter 96 has a 4 volt range on its input relative to a reference input which is connected to ground, and has a 12-bit output represented by $D_{0-11}$. During a first portion of a read cycle in any of the +X, −X, +Y or −Y directions, the positive signal on the line 192 operates the switching transistors 198 and 200 to energize the tablet with a 4 volt voltage across the entire X or Y dimension being measured. The two most significant bit outputs of the analog-to-digital converter 96 represent one of four areas along this dimension being measured. These two most significant data bits are stored in the latches 206. During the second portion of the read out cycle while the line 192 is low, the decoder circuit 208 energizes a selected one of the lines 210, 211, 212 and 213 in accordance with the region determined by the stored data bits in latches 206. The selected line 210, 211, 212 or 213 applies a selected 16 volt range across the X or Y dimension of the resistance data plane such that a 4 volt voltage gradient is produced across the area determined by the output of the latches 206. Thus during the second portion of the read out cycle, the outputs of the analog-to-digital converter 96 read the relative position within the quadrant or area selected by the stored data in latches 206. The outputs of the analog-to-digital converter 96 and the latches 206 thus form a 14 bit data reading, represented by $D_0$–$D_{13}$, resulting in greatly enhancing the resolution of the data reading from the resistance tablet. The present resolution enhancement technique produces improved speed in high resolution tablet requirements where the employment of analog-to-digital converters with equivalent bit outputs would severely restrict the reading speed since the smaller analog-to-digital converters can detect voltages at substantially faster rates of speed.

In a variation, the line 192 can be kept high when a probe rapidly travels across the tablet surface. Only the 12-bit output is used to indicate position of the probe; i.e. bits $D_{12}$ and $D_{13}$ are ignored. This permits the sensing rate to be more than doubled (i.e. $\phi/2.5$) so that the motion of the probe can be more closely followed. Then when the velocity of the probe decreases, the line 192 can be again controlled by source 190 to permit return to the full 14-bit resolution in reading X and Y positions.

While the circuit illustrated in FIG. 8 shows expansion of a 12-bit analog-to-digital converter by 2 bits, the technique may be applied to extend voltage ranges of analog-to-digital converters by more or less bits. For example, if $V_R$ is the analog-to-digital voltage range and N the number of most significant bits then the maximum voltage $V_M$ equals $V_R$ times $2^N$. A reasonable limit is a $V_R$ equal to 2, N equal to 6 giving a maximum voltage range of 128 volts for expanding a 12-bit analog-to-digital conversion from 12 bits to 18 bits. Alternatively, a fast 6-bit or 8-bit analog-to-digital converter may be selected during a first portion of the reading cycle and a slower 10-, 12- or 16-bit analog-to-digital converter may be used during the second portion of the reading cycle (with appropriate extension of the second portion of the reading cycle) for producing the highest readout speed in expanding resolution to 16–24 bits. For example, a fast 6-bit analog-to-digital converter is switched into the circuit to replace the 12-bit analog-to-digital converter 96 during a first fast portion of the read out cycle while a slower 10-bit analog-to-digital converter is switched into the circuit during the second slower portion of the read out cycle. The 6-bit reading selects one of 64 regions in which the 10-bit reading is made. The more significant 6-bit reading and lesser significant 12-bit reading produce a 16-bit reading. If only 4 of the most significant bits of the 6-bit analog-to-digital converter during the fast cycle portion are employed to select the region in which the slower 10-bit reading is to occur and to expand the 10-bit analog-to-digital converter reading into a 14-bit analog-to-digital reading, a speedup of 10 to 20 times the reading cycle can be produced compared to utilization of a single 14-bit analog-to-digital converter.

It is noted that the absolute linear accuracy of the tablet reading is not changed by the increase in resolution of the reading. The absolute accuracy is determined by the noise level and non-linearity of the tablet. For example, a 12-bit resolution of a 1.2 meter (48 inch) square tablet could resolve 0.0025 mm (0.0001 inches) which is well below the noise level of the tablet. Also for large tablets of 0.6 meters (24 inches) and above, only the capacitive probe can be easily used because of excessive capacitance between the resistance layer and the underlying conductive layer.

Figure 9:
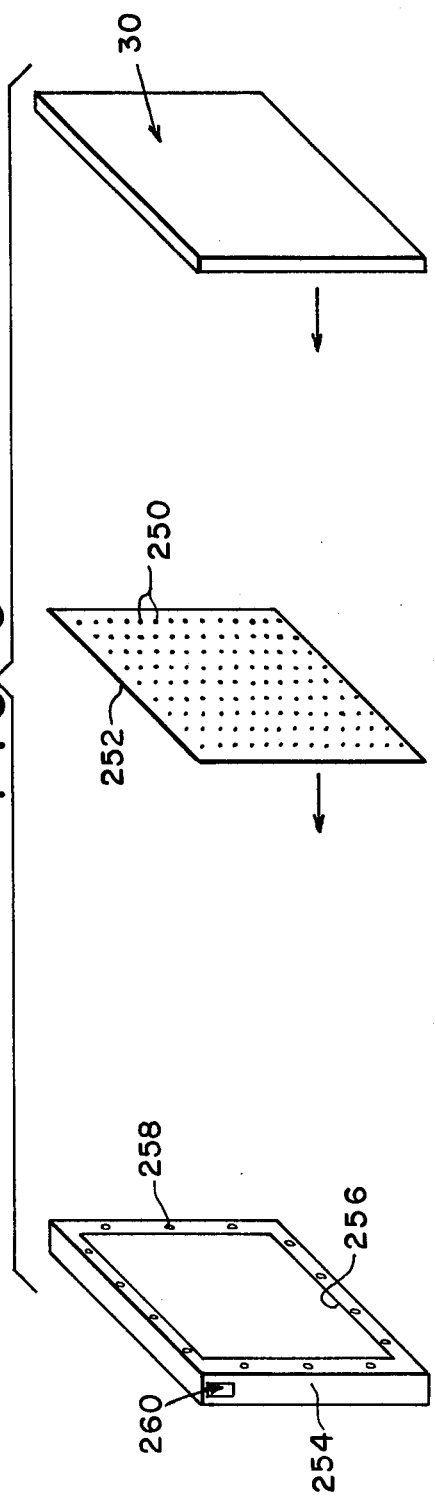
FIG. 9 is an exploded assembly view of a graphics tablet assembly employing spot calibration means.

Referring to FIG. 9, precision reference holes 250 are punched into a stable sheet of plastic such as polyester, polysulfone, etc. which is coated with an adhesive on both sides. The plastic sheet 252 is assembled with base 254 within a slight recess 256 formed therein to receive the sheet. The base can be formed from a clear material such as polycarbonate. The tablet 30 formed from thin, e.g. 1.6 mm (0.0625 inches), tempered glass sheet 36, FIGS. 1 & 2, upon which the conductive and resistive pattern has been structured is then assembled on the base 254 on top of the sheet 252. The plastic sheet 252 has a different adsorption, reflection, transmission or interference characteristic than the base 254, so that the locations of the reference holes 250 are visible to nearinfrared energy and/or visible light. Additionally, the base 254 can be provided with edge connectors 258 for connecting to the conductive strips 52–59 of tablet 30 and can include a connector 260 for connecting the tablet to a cable which connects to electronic circuitry.

Alternatively, precision reference holes can be drilled or formed in the substrate and backfilled with a material containing a dye or other material having a suitable differential absorption, reflection or transmission characteristic.

A capacitive cursor, illustrated in FIGS. 11, 12, 13, 14 and 15, includes a cursor body 264 with three capacitive pickups 266, 268 and 270, a visible light source 272, a reference spot infrared source 274, an infrared detector 276 and an optical assembly 278. Pickups 266, 268 and a shield 280 are transparent conductive patterns on a glass plate or other transparent nonconductive substrate and are located on the bottom surface of the cursor. Pickup 270 is a gold wire or strip formed on the top surface and side surfaces of the cursor body 264 for being engaged by an operator's hand. The cursor also includes a keyboard 282 mounted by a fastener 294 on the cursor body 264. The keyboard 282 is formed by a plurality of separate conductive areas or tabs 283 which lie coplanar with the bottom of the cursor and are exposed for being selectively engaged by a finger of an operator to couple the selected area 284 to the pickup 270. A switch 296 is provided for selectively connecting the pickup 270 to electronic circuitry.

The optical assembly 278 includes a glass cover top 284 formed from glass or other transparent material with a tubular support 286 for containing a prism or mirror assembly indicated generally at 288 and a lens assembly indicated generally at 290 for directing respective beams of light and near-infrared from the respective sources 272 and 274 downward in a line without parallax onto the tablet at the location of the pickup 266 and for directing a reflected beam of the near-infrared to a mirror or prism 292 which directs the reflected infrared beam to the detector 276. The assembly 288 includes a reflective surface 287 for reflecting near-infrared from the source 274 downward to the lens system 290 and includes a partially reflective surface 289 for passing the infrared but reflecting light from the source 272 downward to the lens system 290. The lens system 290 includes lenses 291 and 293 and an aperture diaphragm for forming and focusing beams of the light and near-infrared onto a spot 297 of the graphics tablet. This spot is centrally located relative to the electrode 266. The mirror assembly 292 includes a partially reflective surface 298 and a reflective surface 299 for directing infrared reflected from the spot 297 via reflective surface 287 to the detector 276; the surface 298 passing the reflected infrared from the spot 297.

In operation, an operator positions the cursor over the table 30 and in a conventional manner produces readings of the particular location of the capacitive pickups 266 and 268. The particular position of the pickup 266 can be visually controlled by the operator observing the light beam projected from the source 272 through the mirror arrangement 288 and the lens system 290. When the pickup 266 is directly over one of the holes 250 in the dielectric sheet 252, FIG. 9, the differential in reflectivity of the near infrared radiation is detected by the computer attached to the cursor to calibrate the readings from the resistive layer 38 and thus obtain more accurate graphical data. When the spots 250 are visible, the operator can position the cursor at will to run a calibration of the tablet. When switch 296 is operated, the operator can touch one of the areas 283 on the keyboard 282 completing a path between the electrode 270 and the selected conductor 283. The position of the selected area 283 is sensed by its capacitive coupling to the graphics tablet in the same manner as the position of the electrodes 266 and 268 are sensed. The computer connected to the cursor and graphics tablet determines the selected area 283 from the sense position relative to the sensed positions of the electrodes 266 and 268. The computer can assign a symbol or function to the selected key 283.

In addition, the cursor may contain conventional signal conditioning means to minimize noise.

Alternatively, the table consists of a series of precisely located conductors on a substrate with connections to edge and beyond (for instance Indium Tin Oxide on a glass substrate), a thin insulating spacer, and a graphics tablet with a series of holes in its homogenous active resistance area placed so as to lie precisely over the conductor pads. A selected distinct frequency is given a pulse code modulation corresponding to each separate conducter. When the capacitive probe approaches one of these regions, the matter reference point code is separated from the X and Y data and used by the tablet controller to check and correct the X and Y measures. Large tablets (spanning many feet) may be made with a reference and retain high lineal resolution and stability. With transparent tablets light or infrared emitting diodes secured to the substrate could provide a reference to a suitable detector in the captive probe.

Figure 21:
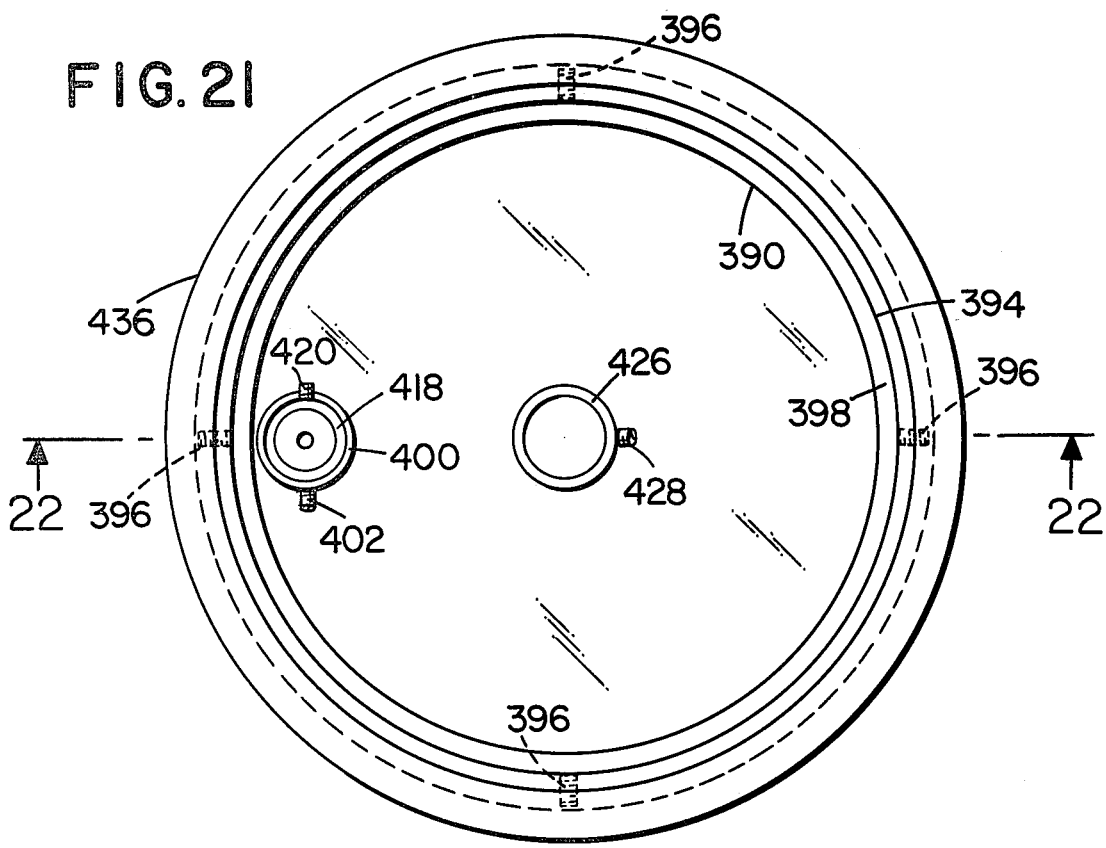
FIG. 21 is a top view of a light spot generator variation for a capacitive probe.
Figure 22:
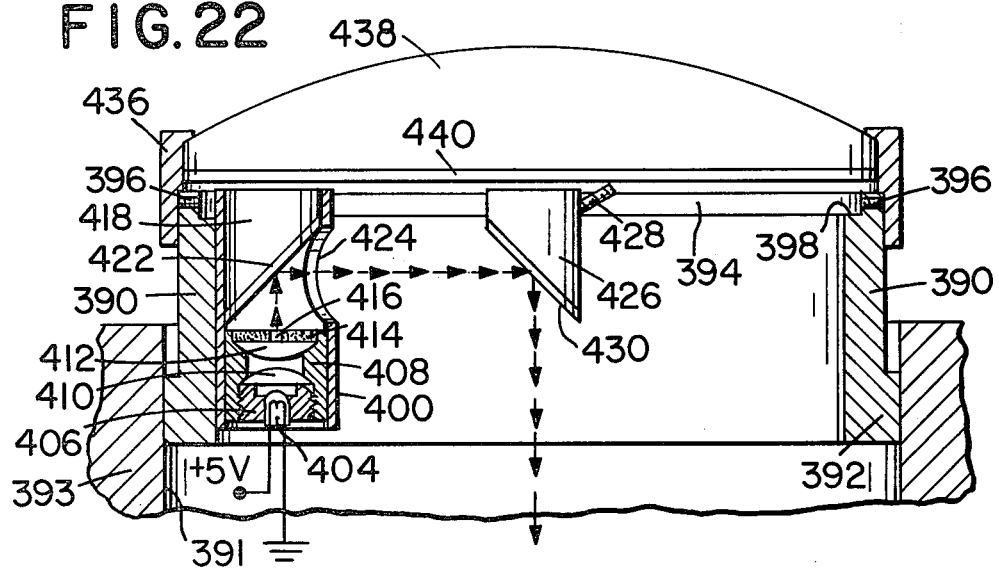
FIG. 22 is a section view taken at line 22—22 in FIG. 21.

As shown in FIGS. 21 and 22, a parallax-free lightspot generator suitable for insertion in the viewing opening of a conventional capacitive probe includes an outer support ring 390 with an enlarged lower portion 392 having a diameter suitable for fitting in the viewing opening 391 of a conventional curser 393. A transparent plastic carrier plate 394 is secured by set screws 396 within an annular groove 398 formed in the inner upper edge of the ring 390. A support tube 400 is secured by a screw 402 in an opening at one side of the carrier plate 394 and extends downward therefrom. A lamp 404 is mounted centrally in a holder 406 threaded in the lower end of a tubular lens support 408 secured in the lower end of the tube 400. A collimating lens 410 is secured at its outer edges between the upper end of the holder 406 and an annular shoulder of the lens support 408 while a condensing lens 412 is secured in the upper end of the lens support 408 along with a polarizer disc 414 which has a central opening 416 formed therein. A tubular mirror support 418 is mounted in the upper end of the tube 400 by a screw 420 and has a mirror 422 mounted on the lower end thereof at a 45° angle to the vertical for reflecting light from the lamp 404 and lenses 410 and 412 toward the center of the generator through an opening 424 formed in the tube 400. Within an opening in the center of the support disc 394, a tubular support 426 is secured at its upper end by a screw 428 and supports a mirror 430 at a 45° angle relative to the vertical in the path of light reflected from the mirror 422 for reflecting the light downward. The lenses 410 and 412 are selected to condense light passing through the center opening 416 of the polarizer at a small spot 432, FIG. 23, on the graphics tablet with light passing through the annular portion of the polarizer 414 impinging in a larger area 434 surrounding the spot 432. The position and orientation of the mirrors 422 and 430, the lenses 410 and 412 and the lamp 404 can be adjusted by loosening the appropriate screw or screws 396, 402, 420 and 428, adjusting the position of the tubes 400, 418 and 426, and then properly retightening the screws.

The spot generator also includes a conventional photographic polarizing lens assembly including a lens 438 and a polarizing disc 440 secured in a ring 436 which has a lower portion suitable for being slip fit over the upper end of the support ring 390. This lens assembly can be selectively rotated to rotate the polarizer 440 to partially block polarized light passing through the annular portion of the polarizer 414.

Figure 23:
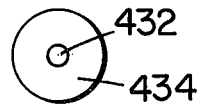
FIG. 23 is a plan view of a spot arrangement generated by the generator of FIGS. 21 and 22 on a graphics tablet.

In operation of the cursor with the spot generator of FIGS. 22 and 23, light from the lamp 404 is condensed by lenses 410 and 412 and reflected by mirrors 424 and 430 to impinge on a graphics tablet or pad on which the cursor is positioned. As viewed through the lens 438 and polarizer 440 the light impinging on the tablet forms the small bright spot 432 surrounded by the larger light area 434 which is substantially less bright due to the polarized light passed by the annular polarizer 414 being partially blocked by the polarizer 440. This small bright light spot 432 surrounded by the annular light area 434 of lesser brightness, enables an operator to accurately position the cursor on the tablet. Since the spot 432 and annular area 434 are directly generated on the tablet; positioning of the cursor is not subject to parallax error which occurs in prior cursors which have locating markers mounted in the cursor viewing opening. Additionally the magnification provided by the lens 438 aids in accurate positioning.

Figure 5:
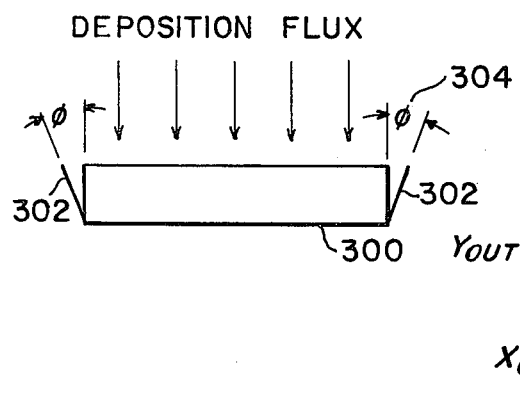
FIG. 5 is an elevation view illustrating a modified method of manufacturing a resistance pad.

In FIG. 5, there is illustrated a technique for depositing resistance material on a substrate in order to form high resistivity edge portions connected to the central square resistive area 300. The edge portions 302 on all four edges of the square area 300 are bent at an angle 304 relative to the central area 300. The resistive material is deposited by means of the application of a uniform flux of the resistive material directed perpendicular to the area 300 of the substrate. The resistivity of the flux applied to the edge portions 302 is equal to the secant of the angle 304 times the resistivity of the central area 300. This deposition technique eliminates the necessity of separate steps of masking, etching or deposition for the different resistivity of the edge portions. Alternatively, the substrate may be formed as a dish with corners connected between the edge portions 302 wherein the corners are utilized to provide for linearization correction in a manner similar to that described in U.S. Pat. No. 4,214,122.

Figure 6:
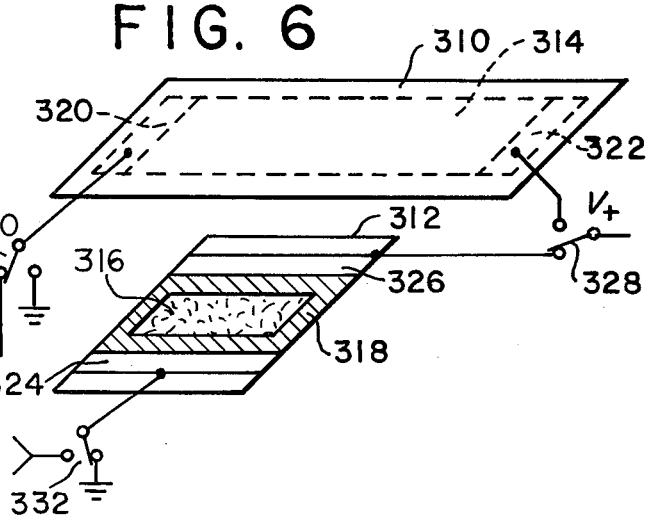
FIG. 6 is a perspective diagram illustrating a variation of the graphical data entry tablet.

In another variation illustrated in FIG. 6, respective upper and lower substrates 310 and 312 have resistive areas 314 and 316 disposed thereon and overlying one another with a thin spacer 318 formed therearound defining a central area forming the tablet region to be selected. Conductive strips 320 and 322 are joined with respective opposite edges of the resistive area 314 and conductive strips 324 and 326 on the substrate 312 are joined with respective opposite edges of the resistive area 316; the conductive strips 320 and 322 being disposed relative to each other in a direction which is orthogonal to the direction that the strips 324 and 326 are disposed relative to each other. A double throw switch means 328 is provided for alternately connecting a positive voltage source to the conductive strips 322 and 326 while double throw switch means 330 is provided for alternately connecting the conductor 320 to ground and to a Y-directional readout line for one direction and ground. A double throw switch 332 is provided for alternately connecting the conductive strip 324 to ground and to an X-directional readout line.

In operation of the graphics pad arrangement of FIG. 6 during a first readout step, the switch 328 connects the voltage V+ to the conductor 326 and the switch 332 connects the conductor 324 to the ground establishing a potential gradient throughout the resistance area 316 in one direction. The conductor 320 is connected to the Y depressed at a selected point to cause engagement of the resistive layer 314 with the resistance layer 316, the resistance 314 acts as a conductor. The voltage produced on the Y-output corresponds to the relative position of the contact between the electrodes 324 and 326. During a second portion of the cycle the switch 328 connects the voltage V+ to the conductor 322 and the switch 330 connects the conductor 320 to ground while the switch 332 connects the conductor 324 to the X-directional output line to produce a voltage reading of the relative position of the selected point between electrodes 320 and 322 in the X-direction which is orthogonal to the Y-direction.

A modified assembly and technique for providing edge connections to graphics input tablets is illustrated in FIGS. 16, 17, 18, 19 and 20. A substrate 340 has deposited thereon a resistance layer 342 to form the square area to be connected by a probe or to be coupled thereto by a capacitance probe. A second substrate 344 is provided with isolating resistance areas 346 and 347 along one edge of the substrate 344 and isolating resistance areas 348 and 349 disposed along a second edge opposite to the first edge; the resistance areas 346 and 347 being separated by a space therebetween along a center line of the substrate while the resistance areas 348 and 349 are similarly separated along the center line. Conductive strips 352, 353, 354 and 355 are disposed on a central portion of the substrate 344 connected to inner edges of the respective resistance areas 346, 347, 348 and 349 opposite to the respective first and second edges. A third substrate 360 is provided with isolating resistance areas 362 and 363 along a first edge of the substrate 360 and isolating resistance areas 364 and 365 along a second edge opposite to the first edge. The resistance areas 362 and 363 are separated at a midpoint along the first edge while the resistance areas 370 and 371 are separated at the midpoint along the second edge. The first and second edges of the second substrate 360 are orthogonally related to the first and second edges of the first substrate 344. Respective conductor strips 368, 369, 370 and 371 on the substrate 360 are connected to the respective resistance areas 362, 363, 364 and 365 on edges opposite to the first and second edges. The resistance areas 346–349 and 362–365 have an effective resistance, parallel to the respective edges along which they run, which is substantially greater than the resistance of the layer 342 on the substrate 340.

The substrate 344 is positioned on the back of the substrate 340 and a plurality of spaced conductors 376 are connected between the first outside edges of the resistance areas 348 and 349 to the first edge of the resistance area 342. Conveniently the connection of the conductors 376 can be made by a conductor strip assembly indicated generally at 374 in FIG. 19 wherein the plurality of conductors 376 are held together by insulated holding members 378. Also the outer edges of the resistance areas 346 and 347 on the second edge of the substrate 344 are connected by a plurality of the spaced conductors 376 to the second edge of the resistive layer 342 opposite the first edge. Then the substrate 360 is assembled on top of the connected substrate 344. Pluralities of the spaced conductors 376 are utilized to connect the outer edges of the respective resistance areas 362, 363, 364 and 365 to respective third and fourth edges of the resistance layer 342 wherein the third and fourth edges are orthogonal to the first and second edges of the resistance layer 342. The resistance tablet illustrated in FIG. 20 forms the electrical equivalent of the graphics tablet illustrated in U.S. Pat. No. 4,079,194.

The present graphics tablet has the advantage of occupying a relatively small space or area and not requiring large areas for linearization or the high resistance areas which connect to the central linear resistance area.

Since many modifications, variations and changes in detail can be made to the above described embodiments, it is intended that all matter in the above description and shown in the accompanying drawings be interpreted as illustrative and not in a limiting sense.

What is claimed is:

1. A graphical entry device comprising
   a rigid base member having a flat conductive upper surface,
   a thin nonconductive plate formed of a material selected from glass or rigid plastic disposed over the base member in close proximity thereto,
   a layer including resistive material on the underside of the thin plate and extending parallel the conductive upper surface of the base member in spaced relationship therewith,
   said plate being elastically deformable to engage a point of the resistive material with the conductive surface where depressed,
   said plate being sufficiently thin to permit substantial capacitive coupling therethrough between a capacitive probe and the resistance layer, and
   wherein the layer on the underside of the thin plate includes
   a generally rectangular resistive graphic area with four edges and four corners, each of the four edges defining a midportion separating a pair of spaced joining portions extending from the midportion to the respective corners,
   four pairs of conductor strips spaced from and extending along the respective pairs of joining portions,
   four pairs of resistive edge connecting means joining the respective pairs of conductor strips to the respective pairs of joining portions, said resistive edge connecting means each having an effective resistance parallel to the respective joining portions substantially greater than that of the graphic area and the respective conductor strips, and
   four conductors connected to respective midportions for providing analog-to-digital converter reference voltages.

2. A graphical entry device comprising an electrically inslated substrate; and a patterned layer on the substrate wherein the patterned layer includes
   a generally rectangular resistive graphic area with four edges and four corners, each of the four edges defining a midportion separating a pair of spaced joining portions extending from the midportion to the respective corners,
   four pairs conductor strips spaced from and extending along the respective pairs of joining portions,
   four pairs of resistive edge connecting means joining the respective pairs of conductor strips to the respective pairs of joining portions, said resistive edge connecting means each having an effective resistance parallel to the respective joining portions substantially greater than that of the graphic area and the respective conductor strips, and
   four conductors connected to the respective midportions for providing analog-to-digital converter reference voltages.

3. A graphical entry device as claimed in claim 1 or 2 wherein the resistive graphic area has four notches formed therein at the midportions of the respective four edges, and the four conductors are connected to the midportions at the bottom edges of the notches.

4. A graphic entry apparatus comprising
a member having a planar resistance thereon,
a capacitive probe for being moved over the member having the planar resistance and capacitively coupling to selected points thereof;
means for sequentially energizing the planar resistance with at least first, second and third voltage conditions wherein the first voltage condition produces a voltage gradient across the planar resistance in a first direction, the second voltage condition produces a voltage gradient across the planar resistance in a second direction which is orthogonal to the first direction, and the third voltage condition produces a uniform voltage throughout the planar resistance;
means connected to the probe and including amplifier means operated during the first and second voltage conditions for generating signals indicative of the position of the probe; and
gain control means connected to the probe and operated during the third condition for controlling the gain of the amplifier means to prevent variations in capacitive coupling between the probe and the resistance from changing the value of position signals.

5. A graphic entry device as claimed in claim 4 including four-phase clock generator means with means for producing four sequential phase signals and periods between the phase signals; and wherein
said means for sequentially energizing the planar resistance includes tablet switch drive means operated by the phase signals which (a) during the first phase signal energizes the tablet with a gradient voltage in a first direction, (b) during the second phase signal energizes the planar resistance in a second direction opposite to the first direction, (c) during the third phase energizes the planar resistance in a third direction orthogonal to the first direction, and (d) during the fourth phase signal energizes the planar resistance in a fourth direction opposite to the third direction;
said means for generating signals indicative of the position probe includes analog-to-digital converter means; and
said gain control means includes integrator means and switching means connecting the integrator means to the output of the probe during the periods between phase signals.

6. A graphic entry apparatus as claimed in claim 5 including indicating means operated when the output of the integrator means reaches a predetermined value for indicating that the capacitive probe is in sufficiently close proximity to the planar resistance.

7. An analog data tablet apparatus with enhanced resolution comprising
a resistance having at least one elongated dimension,
probe means for being selectively coupled with a selected point on the resistance,
analog-to-digital converter means connected to the probe means for producing a digital output corresponding to a voltage on the probe means within an analog operating range of voltages,
first means for applying a voltage equal to the analog operating range of voltage across the resistance during a first portion of a reading cycle,
means responsive to the output of the analog-to-digital converter means for determining a region of the resistance within which the selected point is positioned, and
means controlled by the region determining means for applying across the resistance a corresponding one of a plurality of voltages substantially greater than the analog operating range of voltages during a second portion of the reading cycle such that the analog operating range of voltages is produced across the determined region of the resistance whereby the analog-to-digital converter means during the first and second portions of the reading cycle produces respective outputs indicating the position of the selected point with enhanced resolution.

8. An analog data tablet with enhanced resolution as claimed in claim 7 wherein the means responsive to the output of the analog-to-digital converter means includes latch means controlled by at least one most significant bit output of the analog-to-digital converter means, and the means for applying one of a plurality of larger voltages across the resistance includes switching means controlled by the latch means during the second portion of the reading cycle.

9. A resistance graphics tablet comprising
first, second and third rectangular substrates positioned on top of each other,
a uniform resistance layer covering one side of the first substrate,
first and second isolating resistance areas extending on opposite edges of the second substrate,
first and second pluralities of connecting means connecting the first and second isolating resistance areas to respective first opposite edges of the uniform resistance layer,
third and fourth isolating resistance areas extending on opposite edges of the third substrate, and
third and fourth pluralities of connecting means connecting the respective third and fourth isolating resistance areas to respective second opposite edges of the uniform resistance layer.

10. A resistance graphics tablet as claimed in claim 9 wherein the first, second and third rectangular substrates have substantially the same rectangular size, the first and second isolating resistance areas are all divided into respective halves so that one half of a resistance area extends only along one half of a substrate edge, and there is included conductor strips on the second and third substrate connected to the respective halves of the resistance areas.

11. A cursor device for capacitively coupling to a graphics tablet, comprising
a body having a bottom surface adapted for sliding on the graphics tablet and including a vertical opening therethrough for viewing an area of the tablet,
a transparent bottom member extending over the opening on the bottom of the opening,
a transparent electrode mounted on the bottom member centrally relative with the opening, and
light beam generating means mounted on the body for generate a vertical beam of light concentric with the electrode to enable accurate positioning of the cursor device.

12. A cursor device as claimed in claim 11 wherein the light beam generating means includes means for generating a bright central point of light on the tablet, and means for generating a low intensity larger spot of light on the tablet concentric with the bright central point of light.

13. A cursor device as claimed in claim 12 wherein the light beam generating means includes a light source, collimating lens means for producing a collimated beam of light from the light source, condenser lens means for condensing the collimated beam of light to an area on a tablet, annular polarizer means for polarizing an outer portion of the beam of light, and second polarizer means over a viewing opening and rotated to partially block the polarized light reflected from the area on the tablet.

* * * * *